United States Patent [19]

Staheli et al.

[11] 4,041,770
[45] Aug. 16, 1977

[54] METHOD AND APPARATUS FOR SENSING THE THICKNESS OF A FIBER LAYER ON A MOVING SURFACE

[75] Inventors: Paul Staheli, Wilen near Wil; Robert Moser, Winterthur, both of Switzerland

[73] Assignee: Rieter Machine Works, Ltd., Winterthur, Switzerland

[21] Appl. No.: 626,753

[22] Filed: Oct. 29, 1975

[30] Foreign Application Priority Data

Sept. 30, 1975 Switzerland ............... 12637/75

[51] Int. Cl.² ............................................ G01B 13/06
[52] U.S. Cl. .......................................... 73/37.5; 73/159
[58] Field of Search ............... 73/37.5, 37.6, 37.7, 73/159; 33/DIG. 2

[56] References Cited

U.S. PATENT DOCUMENTS

| 3,157,915 | 11/1964 | Gilbo | 73/159 X |
| 3,218,844 | 11/1965 | Kleist et al. | 73/37.5 |
| 3,411,352 | 11/1968 | Stoller | 73/37.7 X |
| 3,496,744 | 2/1970 | Mizuno et al. | 73/37.7 X |

FOREIGN PATENT DOCUMENTS

| 22,910 | 10/1968 | Japan | 73/37.7 |
| 952,886 | 3/1964 | United Kingdom | 73/159 |

Primary Examiner—Richard C. Queisser
Assistant Examiner—Joseph W. Roskos
Attorney, Agent, or Firm—Kenyon & Kenyon, Reilly, Carr & Chapin

[57] ABSTRACT

A pneumatic measuring means is placed over the main cylinder to measure pressure variations due to changes in fiber layer thickness. The measured pressures are transmitted to a measuring and control means which compares the measured pressures to a pre-set value and produces a difference signal which is then used to control the card. The difference signal can be imposed on the supply means for the card, the doffing means or the drafting means.

16 Claims, 4 Drawing Figures

METHOD AND APPARATUS FOR SENSING THE THICKNESS OF A FIBER LAYER ON A MOVING SURFACE

This invention relates to a method and apparatus for sensing the thickness of a fiber layer in a moving surface and particularly, the moving surfaces of a fiber handling machine in order to control the machine.

Heretofore, various techniques have been known for measuring vaious variables during the operation of a card in order to control the card. In one instance, as described in German GM 7,237,903 a measuring device is used to measure the thickness of a layer of fiber material supplied to a licker-in roll of the card. In this case, the fiber material is passed between a supply roll and a hollow body filled with a gas or with a liquid, which hollow body is provided on the side contacting the layer of fiber material with a membrane and which is arranged at a constant distance from the supply roll. During operation, irregularities in the supplied fiber material layer are transmitted via the membrane to the medium in the hollow body and are transmitted therefrom to a pneumatic or hydraulic measuring device. These irregularities in the relatively thick layer of fiber material, however, cause small deformations of the membrane only which, in turn, generate very small pressure variations in the hollow body. As a result, any inaccuracies in the measurements are considerably magnified by the amplification needed to use the measurements.

A further known device is described in Swiss Patent 436,779 and comprises a nozzle through which the silver delivered by the card passes. The cross-section of the nozzle decreases in the direction of sliver movement while a hollow chamber is provided in the nozzle between two planes arranged at right angles to the nozzle axis. A manometer is also connected to this hollow chamber. The function of this device is based on the compression of the air confined in the fiber material which occurs during passage through the nozzle. This indicates a value on the manometer which is used as a measuring value for the card control. Such measuring devices frequently are combined with the condensors or trumpets which condense the fiber sliver and are arranged downstream from the web take-off device of the card. However, any variations in the substance cross-section of the fiber material being processed are measured at a moment in which the sliver has already left the card. As a result, the control action of the device influences the material being supplied to the card only after a time lag.

Accordingly, it is an object of the invention to measure fiber material passing through a fiber handling machine to establish a measuring value based on which the material supply and/or the material delivery is controlled so that a fleece or sliver as uniform as possible is obtained and so that variations are levelled out.

It is another object of the invention to provide a simple method of determining changes in a fiber layer being processed on a fiber handling machine.

It is another object of the invention to provide a simple apparatus for responding to changes in a fiber layer on a fiber handling machine to maintain a uniform output.

It is another object of the invention to provide a means of responding rapidly to changes in fiber layer thickness on a fiber handling machine to adjust the operation of the machine to compensate for these changes.

Briefly, this invention relates to a method of controlling a fiber handling machine and to a fiber handling machine for producing uniform output.

The method of the invention is directed to the sensing of changes in fiber layer thickness in a fiber handling machine including a moving surface receiving and conveying a fiber layer thereon. The method comprises the steps of guiding the fiber layer on the moving surface under a cover plate and sensing pressure differences in the fiber layer on the moving surface under the plate due to variations in fiber layer thickness. The sensed variations are then used to control the operation of the machine to obtain a uniform output.

While various types of fiber handling machines may utilize the invention, reference will be specifically made in the following description to a card.

The card employing the invention has a plurality of operating elements including a moving surface, such as a rotatable main cylinder, for receiving and conveying a fiber layer thereon. In accordance with the invention, a plate is disposed a preset distance above the cylinder to define a chamber therebetween for passage of the fiber layer and a duct is connected to the plate in communication with at least one sensing point below the plate to transmit pneumatic signals corresponding to thicknesses of the fiber layer thereat from the sensing point. In addition, a measuring and control means is disposed at a point remote from the cylinder for receiving the pneumatic signals from the duct to produce a control signal in response thereto. This latter means compares the pressure prevailing at the sensing point with a pre-set value to produce a difference signal for controlling an operating element of the card.

The operating elements of the card also include a plurality of flats about the cylinder and a licker-in roll for transferring a fiber layer to the cylinder as well as a gear drive or variable speed drive for driving a supply means which delivers fiber upstream of the licker-in roll or for driving a doffing means or drafting means downsteam of the main cylinder.

The invention is based on the findings that pressure variations occur in the material confined in the chambers between the main cylinder and the cover plates of the main cylinder at any place along the circumference of the main cylinder or between any other cylinder of the machine and that these pressure variations are proportional to the thickness variations of the processed fiber material. The method of establishing measuring values and of controlling a card is thus characterized in that pressure differences in the fiber layer or web on a cylinder of a card, caused by the thickness variations of the fiber web, are taken into account for controlling the card.

These and other objects and advantages of the invention will become more apparent form the following detailed description and appended claims taken in conjunction with the accompanying drawings in which:

Figure 1:
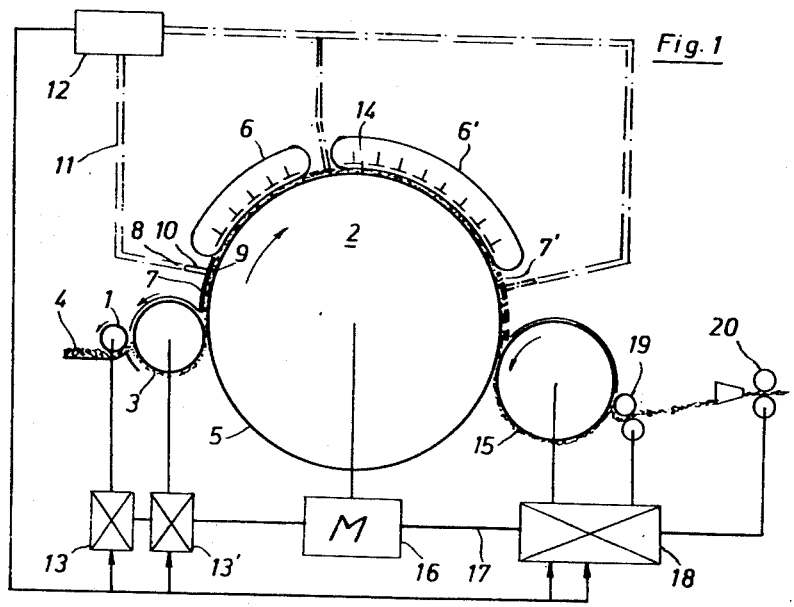
FIG. 1 illustrates a schematic view of a card with pressure sensing connection points in accordance with the invention.

Referring to FIG. 1, a card 2 has a plurality of operating elements including, inter alia, a supply means in the form of a feed roll 1 which together with a licker-in roll 3 delivers fiber material in the form of a compact air containing fiber layer 4 in the usual manner to a moving surface such as a rotating main cylinder 5. A plurality of flats 6 is disposed about the cylinder 5 as is known.

A sensing point 8 is established between the first plurality or set of flats 6 and the licker-in roll 3 for measurement of the thickness of the moving fiber layer 4. For this purpose, a suitable sensing means is provided at the sensing point 8 in the form of a cover plate 7 which is disposed a preset distance above the main cylinder 5 to define a chamber therebetween for the passage of the fiber layer 4. In addition, the plate 7 has a bore 9 which is provided with a connecting nozzle 10 so as to communicate the sensing point 8 located under the plate 7 i.e. at the lower side facing the fiber layer 4, with the opposite side of the plate 7.

Referring to FIG. 1, a measuring and control means 12 is connected via a duct 11 to the nozzle 10. The duct 11 by being in communication with the sensing point 8 via the nozzle 10 and bore 9 is able to transmit pneumatic signals caused by the air contained in the fiber layer and corresponding to the thicknesses of the fiber layer at the sensing point 8 to the measuring and control means 12. This measuring and control means 12 is constructed to compare the pneumatic signals (i.e. pressure variations) transmitted from the sensing point 8 with a pre-set value and to take detected deviations into account for controlling the supply of the fiber layer 4.

The control of the fiber supply can be effected by a control gear drive 13 which is controlled by the measuring and control means 12. As shown, the feed roll 1 and the licker-in roll 3 can be driven individually via a controllable gear drive 13 or variable speed drive 13', respectively. The drives 13, 13' are driven off a motor 16 which is also connected via a gear train to the main cylinder 5 to drive the same. In addition, the motor 16 is used to drive a doffing means in the form of a doffer roll 15 and a pair of take-off rolls 19, 20 downstream of the main cylinder 5 via a transmission 17 and a controllable gear drive or variable speed drive 18. This latter drive 18 may also be used to operate a drafting means 20 downstream of the main cylinder 5 and doffing means. Such a drafting means 20 is of conventional construction and is used to draft a fiber layer into a sliver.

Figure 2:
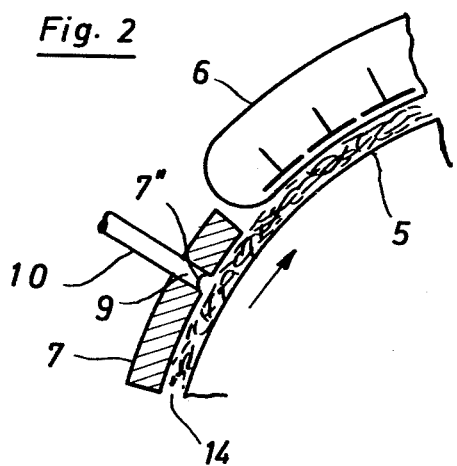
FIG. 2 illustrates an enlarged detail of an example of a sensing point according to FIG. 1.

During operation, after delivery from the licker-in roll 3 to the main cylinder 5, the fiber layer 4 is conveyed under the cover plate 7 (FIG. 2) in the form of a thin fiber web 14 to the set of flats 6. If the thickness of the fiber web 14 varies over the whole cross-section or at individual locations only, a pressure difference Δ P results at the sensing point 8, namely an increase in pressure as the thickness of the fiber web 14 increases and correspondingly a decrease in pressure as the thickness decreases. The difference in pressure is then sensed in the measuring and control means 12 via the ducts 11 and the measuring and control means 12 produces, for example, a difference signal when the measured pressure varies from a preset value so that any one or all of the operating elements, such as the supply means, doffing means and drafting means, can be adjusted to compensate for the change. To this end, the difference signal is emitted to one or all of the drives 13, 13', 18 to make the necessary adjustment in the rate of supply, doffing or drafting.

If the production rate of the card is increased or if the material to be processed is changed, a shift in the pressure level at the sensing points merely results. The relative deviations, however, caused by variations in the thickness of the fiber web remain constant.

Thus, an adjustment carried out once in each case takes care of the card production rate set or of the fiber material processed.

The sensing point, or the sensing points respectively, can also be provided in a cover plate 7' located downstream of the set of flats 6' or, if a plurality of sets of flats 6 and 6' is used, can also be provided between the sets of flats as indicated with dash-dotted lines in FIG. 1. Instead of using only one sensing point 8; a plurality of sensing points can be arranged over the width of the cylinder 5. In this case, the signals transferred from these sensing points are summed up by the measuring and control means 12. Also, the sensing points 8 can be connected pneumatically on the side facing the main cylinder 5 by a groove 7" so that only one bore 9 is required through the plate 7.

Figure 3:
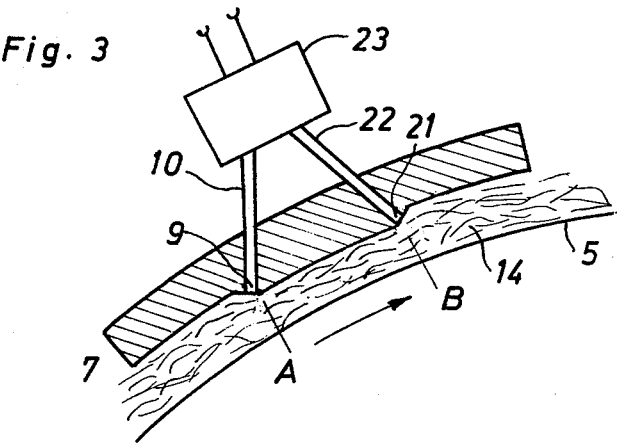
FIG. 3 illustrates a view of a modified sensing and measuring means according to the invention.

Referring to FIG. 3, wherein like reference characters indicate like parts as above, the plate 7 may be modified to enhance the sensing of the fiber layer. To this end, the cover plate 7 is provided with an enlarged portion which narrows the chamber between the plate 7 and main cylinder 5. In addition, the plate 7 has bores 9 and 21 which are provided with connecting nozzles 10, 22 so as to communicate the sensing point 8 located under the plate 7 with the opposite side of the plate 7. The enlarged portion of the plate 7 which extends from a point marked A to a point marked B functions as a throttle means. When the main cylinder 5 rotates, an increasing pressure is generated in the area upstream of the point A with the maximum near A and a minimal pressure near B (FIG. 4), i.e. a decrease in pressure in the area downstream of point A. This enlargement extends across the width of the plate 7 (i.e. perpendicularly of the direction of movement of the fiber layer).

As shown in FIG. 3, the nozzle 10 is provided at the point A and the nozzle 11 at point B. The nozzles 10 and 22 are also in communication with a means 23 for differentiating the pressures sensed at the two points A and B and of producing a signal (as the measuring and control means 12 above) in response thereto. In this regard, it is noted that the differentiated sensing value is greater than the single values at the point A or B.

Figure 4:
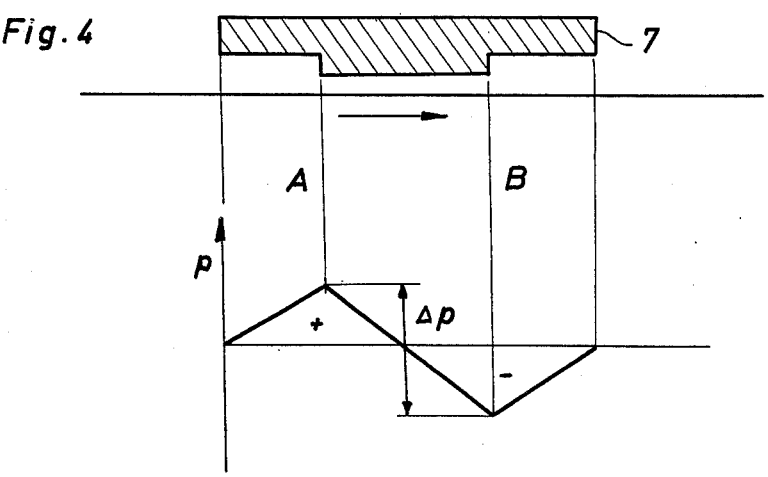
FIG. 4 graphically illustrates a pressure diagram in the area of a sensing point according to FIG. 3.

Referring to FIG. 4, the pressure line under the cover plate 7 is shown schematically. The pressure p is shown on the ordinate, while the distance along the cover plate is shown as the abscissa. The difference of the two sensing values Δ P is the signal, as above mentioned, which is used for controlling a card or other fiber handling machine.

Of course, it is possible to work with one of the two signals only, since the signals are in range of 50 mm Ws above or below a value which depends on the material or the production processed into the card. The position B is especially suitable for producing a constantly good signal, since a subatmospheric pressure is generated which prevents the bore 21 from becoming dirty.

Instead of sets of revolving flats, stationary carding plates can be provided without affecting or changing the substance of the present invention.

Since a card is usually provided with cover plates, no special devices need be provided in order to carry out the invention on existing equipment. This, of course, can be a decisive advantage.

A further advantage of the invention resides in the fact that the location of the sensing points can be chosen at almost any place along the circumference of a card main cylinder or another fiber transporting cylinder. Thus, it is possible to check variations in the thickness of the fiber layer on the main cylinder in close vicinity of the point of supply where the fiber layer is fed to the card main cylinder and to effect a correcting action by adjusting the supply and or the delivery with a minimum time lag. Also, the sliver section can be checked over very short lengths to determine deviations from a determined set value. Thus, it is possible to level out not only long term periodic variations but also medium or short term variations.

What is claimed is:

1. A method of sensing changes in fiber layer thickness in a fiber handling machine including a moving surface receiving and conveying an air containing fiber layer thereon; said method comprising the steps of
   guiding the air containing fiber layer on the moving surface under a cover plate; and
   sensing pressure differences caused by the air contained in the fiber layer on the moving surface at the lower side of the plate due to variations in fiber layer thickness.

2. A fiber handling machine comprising
   a moving surface for receiving and conveying an air containing fiber layer thereon;
   a plate disposed a preset distance above said surface to define a chamber therebetween for passage of the fiber layer;
   a duct connected to said plate in communication with at least one sensing point at a side of said plate facing the layer to transmit pneumatic signals caused by the air contained in the fiber layer and corresponding to thicknesses of the fiber layer thereat from said sensing point; and
   a measuring and control means for receiving pneumatic signals from said duct to produce a control signal in response thereto.

3. A machine as set forth in claim 2 wherein said means compares the pressure prevailing at said sensing point with a pre-set value to produce a difference signal as said control signal for controlling said moving surface.

4. A machine as set forth in claim 2 which further comprises a supply means for delivering fiber upstream of said moving surface and a controllable gear drive for driving said supply means and wherein said means delivers said control signal to said drive to control said drive.

5. A machine as set forth in claim 2 which further comprises a supply means for delivering fiber upstream of said moving surface and a variable speed drive for driving said supply means and wherein said means delivers said control signal to said drive to vary said drive.

6. A machine as set forth in claim 2 which further comprises a web doffing means for doffing the fiber layer from said moving surface and a controllable gear drive for driving said doffing means and wherein said means delivers said control signal to said drive to control said drive.

7. A machine as set forth in claim 2 which further comprises a web doffing means for doffing the fiber layer from said moving surface and a variable speed drive for driving said doffing means and wherein said means delivers said control signal to said drive to vary said drive.

8. A machine as set forth in claim 2 which further comprises a drafting means downstream of said moving surface for drafting a fiber layer into a sliver and wherein said measuring and control means is connected to said draft means to control the operation of said drafting means.

9. A machine as set forth in claim 2 wherein said plate includes a throttle means in said chamber to generate an increase of pressure in the area of said chamber upstream of said throttle means and a decrease in pressure in the area of said chamber downstream of said throttle means.

10. A machine as set forth in claim 9 wherein said throttle means is an enlargement of said plate.

11. A machine as set forth in claim 9 wherein said area upstream of said throttle means constitutes said sensing point.

12. A machine as set forth in claim 9 wherein said area downstream of said throttle means constitutes said sensing point.

13. A machine as set forth in claim 9 wherein said areas each constitute a measuring point, each said area being in communication with a duct and to a measuring and control means for differentiating the pressures sensed at said areas to produce said control signal in response thereto.

14. In combination with a card having a main cylinder for receiving and conveying a fiber layer, at least one set of flats disposed about said cylinder and a licker-in roll for transferring a fiber layer to said cylinder;
   first means for pneumatically measuring the thickness of a fiber layer at at least one sensing point of said cylinder, said means including a throttle means for generating an increase in pressure at a point upstream of said throttle means and a decrease in pressure at a point downstream of said throttle means, said sensing point being located at at least one of said latter points, and
   a measuring and control means for receiving pneumatic signals from said first means corresponding to thicknesses of the fiber layer at said sensing point to produce a control signal for said card corresponding to a difference between the pressure prevailing at said sensing point and a preset value, said control signal being used to control an operating element of said card to effect production of a uniform sliver.

15. In combination with a card having a main cylinder for receiving and conveying a fiber layer, at least one set of flats about said cylinder, a licker-in roll for transferring a fiber layer to said cylinder, a supply roll for delivering fiber material to said licker-in roll, a doffing means downstream of said cylinder for doffing the fiber layer therefrom and a drafting means downstream of said doffing means for drafting a fiber layer into a sliver;
   first means for pneumatically measuring the thickness of the fiber layer on said cylinder at a measuring point, said means including a throttle means for generating an increase in pressure at a point upstream of said throttle means and a decrease in pressure at a point downstream of said throttle means, said sensing point being located at at least one of said latter points, and
   a measuring and control means for receiving pneumatic signals from said first means corresponding to thicknesses of the fiber layer at said sensing point and for comparing said signals to a pre-set value to produce a difference signal in response to deviations of said received signals from said preset value for controlling at least one of said supply roll, licker-in roll, doffing means and drafting means.

16. A fiber handling machine comprising a moving surface for receiving and conveying a fiber layer thereon;

a plate disposed a preset distance above said surface to define a chamber therebetween for passage of the fiber layer, said plate including a throttle means in said chamber to generate an increase of pressure in the area of said chamber upstream of said throttle means and a decrease in pressure in the area of said chamber downstream of said throttle means;

a duct connected to said plate in communication with at least one sensing point below said plate to transmit pneumatic signals corresponding to thicknesses of the fiber layer thereat from said sensing point; and a measuring and control means for receiving pneumatic signals from said duct to produce a control signal in response thereto.

* * * * *